United States Patent [19]

Lodrick, Sr.

[11] Patent Number: 4,783,032
[45] Date of Patent: Nov. 8, 1988

[54] VIDEO CASSETTE WRITING AID

[76] Inventor: Lawrence E. Lodrick, Sr., 2436 Harrison Ave. N., Rochester, Mich. 48063

[21] Appl. No.: 28,794

[22] Filed: Mar. 23, 1987

[51] Int. Cl.⁴ ............................................. B65D 85/672
[52] U.S. Cl. .................................. 248/118.1; 248/150; 206/387
[58] Field of Search .................. 248/118, 118.1, 118.3, 248/118.5, 121, 127, 150, 152, 174, 176, 460, 450, 441.1, 459; 108/67, 102, 43, 49; 206/387

[56] References Cited

U.S. PATENT DOCUMENTS

| | | | |
|---|---|---|---|
| D. 212,403 | 10/1968 | DiVona | 206/387 |
| D. 221,915 | 9/1971 | Goldthwaite | 206/387 |
| 1,458,170 | 6/1923 | Dietsche | 248/152 |
| 1,935,223 | 11/1933 | Davidson | 248/174 |
| 2,025,280 | 12/1935 | Gregg | 248/152 |
| 2,321,794 | 6/1943 | Braun | 206/387 |
| 2,794,496 | 6/1957 | Strand | 248/150 |
| 3,190,267 | 6/1965 | Creel | 248/118.1 |
| 3,220,025 | 11/1965 | Nelson | 108/49 |
| 3,464,569 | 9/1969 | Downing | 248/174 |
| 3,499,595 | 3/1970 | Brooks | 248/174 |
| 4,098,198 | 7/1978 | Patch | 108/161 |

FOREIGN PATENT DOCUMENTS 2140290 11/1984 United Kingdom ................ 108/43

Primary Examiner—Alvin C. Chin-Shue
Assistant Examiner—Robert A. Olson
Attorney, Agent, or Firm—Basile and Hanlon

[57] ABSTRACT

A handrest surface of the writing aid is supported on both ends of side supports. Three lockable hinged joints are parallel to each other and the side supports and, when locked, present a rigid handrest surface. When the hinges are unlocked, the handrest surface collapses, allowing the side supports to move inward toward each other. The dimensions of the writing aid in the collapsed or folded position are approximately the same size as a video cassette, allowing efficient storage of the folded writing aid among a collection of video cassettes. Alternatively, a handrest surface of the writing aid is attached to a support locator surface, which in turn has attached to its opposite edge a video cassette support surface. Attached to the opposite edge of the support surface is a locator positioning the video cassette in the writing aid. When both the nested video cassette and the writing aid are grasped in the non-writing hand, the writing hand rests on the handrest surface, improving writing control upon the video cassette edge.

18 Claims, 1 Drawing Sheet

U.S. Patent    Nov. 8, 1988    4,783,032
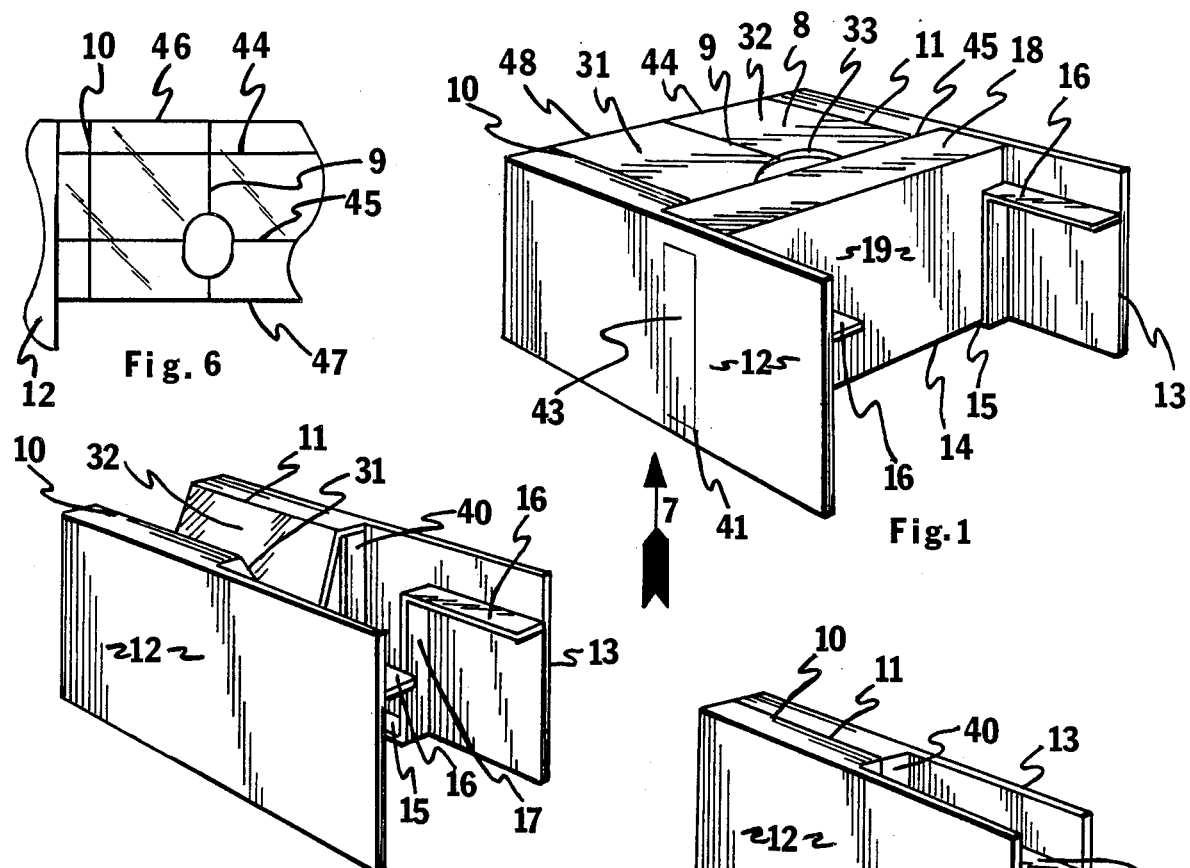
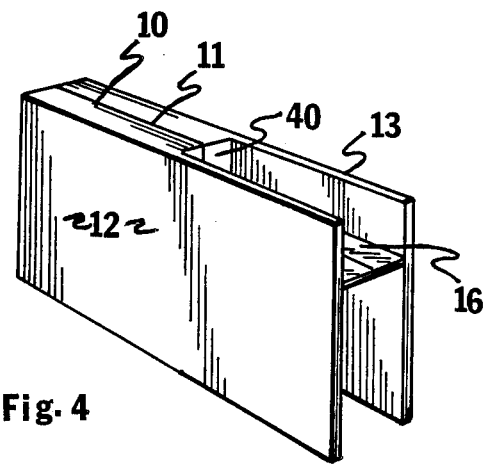
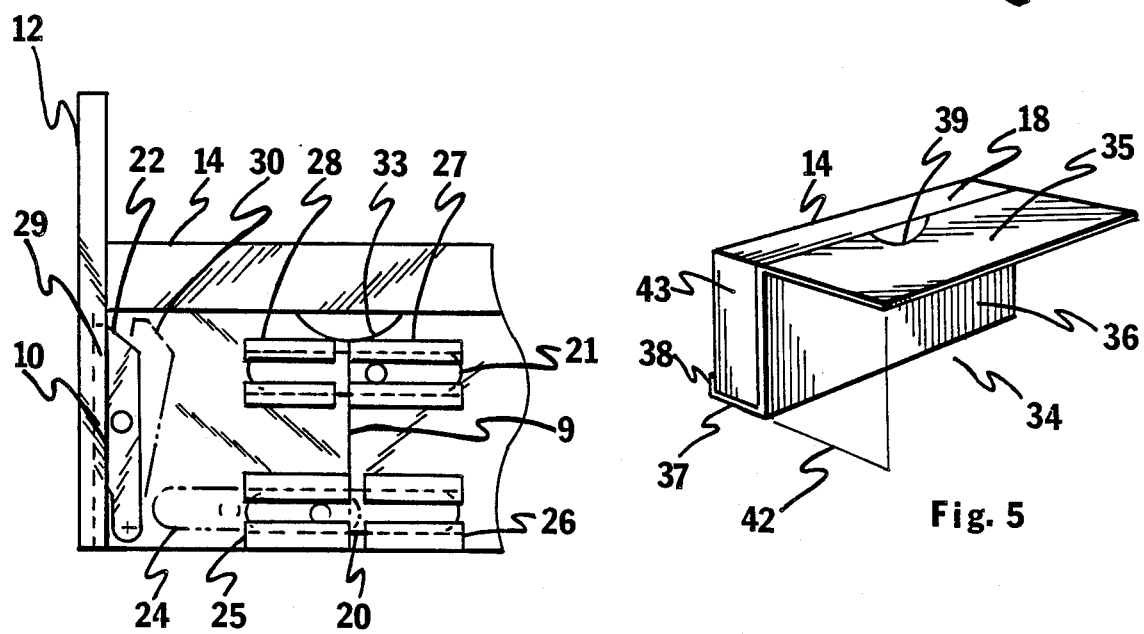

VIDEO CASSETTE WRITING AID

BACKGROUND OF THE INVENTION

I. Field of the Invention

The invention relates to writing devices in general and more specifically to writing aids that afford less difficulty in writing upon the various surfaces of a video cassette or like object.

II. Description of the Prior Art

A search was conducted and no prior art equating to a video cassette writing aid was found.

It would be desirable to provide a writing aid for writing upon the various surfaces of a video cassette, with a handrest surface that makes writing easier, thus more legible and which is convenient to store.

SUMMARY OF THE INVENTION

The present invention relates to a writing aid. The writing aid has a rigid handrest surface. The handrest surface is supported by a support wall at both ends. The handrest surface has three continuous ligamentious joints, heretofore referred to as hinged joints, parallel to each other and to the support walls. There are sliding elements at each hinged joint that when pushed or rotated past said hinged joint and into their respective retaining receptacles, which firmly hold the movable elements in place, and prohibit the hinges from bending; thus presenting a rigid handrest surface. The hinged joints are allowed to unlock by reversing the above procedure and therefore facilitating collapse of the handrest surface for convenient storage of the writing aid.

Two hinged flaps can be attached along both long edges of the handrest surface and can have the three hinged joints previously mentioned. The hinged joints cross perpendicular to each other. When the flaps are positioned perpendicular to the handrest surface, the three hinged joints allowing collapse of the handrest surface cannot bend, thus presenting a rigid handrest surface. Positioning the flaps parallel to the handrest surface allows folding at the three hinged joints. The collapsed writing aid has the same dimensions as a video cassette. The side support walls have support and guide surfaces which properly orient the video cassette's various surfaces, to the handrest surface, for easy and more legible writing on the cassette surfaces. An opening is provided to allow finger access for easy removal of the video cassette from the writing aid.

Another embodiment of the present writing aid includes a rigid handrest surface which is attached, substantially perpendicular, along one entire long edge to a video cassette, locating surface, handrest surface support. Attached substantially perpendicular along the video cassette, locating surface, handrest surface support's entire opposite edge, in a direction opposite to that of the handrest surface, is a video cassette edge support. Attached substantially perpendicular along the video cassette edge support's entire opposite edge, in the same direction as the video cassette, locating surface, handrest surface support, and parallel thereto, is a video cassette edge retainer. The dimensional distance between the retainer and the video cassette locating surface, handrest surface support is the thickness of a video cassette plus slipfit tolerance.

BRIEF DESCRIPTION OF THE DRAWINGS

In the drawings, like reference numerals refer to the same elements throughout the various views and wherein:

FIG. 1 is a pictorial view of the tape writing aid with video cassette in place, on edge;

FIG. 2 is a partial view in direction of arrow 7 of FIG. 1;

FIG. 3 is a pictorial view of the tape writing aid partially collapsed;

FIG. 4 is a pictorial view of the tape writing aid completely collapsed for storage;

FIG. 5 is a pictorial view of a second embodiment of the writing aid;

FIG. 6 is a partial view showing crossed hinge construction.

DETAILED DESCRIPTION OF THE PREFERRED EMBODIMENT

Referring now to FIG. 1, a video cassette writing aid is shown having a handrest surface 8. The handrest surface 8 has a hinged joint 9 at center, and hinged joints 10 & 11 on either side. The hinges are locked into position so as to make surface 8 rigid. Surface 8 is supported by support walls 12 & 13 respectively, when in the locked position. The support walls' inner surfaces are dimensionally separated by the length or height of video cassette 14 plus slip-fit tolerances. On the inside surfaces of support walls 12 & 13 are cassette tape support surface 15 and cassette retainers 17 & 40, see FIG. 3. Support surface 15 and retainers 17 & 40 hold cassette 14 to present edge 18 for writing upon. The dimensional distance between cassette retainers 17 & 40 is the thickness of a video cassette plus slip-fit tolerance. Support 16 provides a surface where the video cassette can be placed on its larger side 19, presenting its opposite side for writing upon. Removal of cassette tape 14 allows for the collapse of the writing aid. Cutout 33 provides a finger access opening for ease of grasping and removal of the video cassette 14 from the writing aid. An opening 41, in surface 12 or 13, at the location of the encapsulated video cassette's short edge 43, allows easier writing upon that edge by utilizing the initial support surface 12 as the handrest surface.

FIG. 2 is a partial view showing the underside of handrest surface 8. Slidable hinge locks 20 & 21, lock center hinged joint 9, while rotatable hinge locks 22 & 23 lock hinged joints 10 & 11 respectively. Slidable hinge lock 20 is manually moved to the left, to position 24, through slide retainer 25, disengaging from slide retainer 26. Slidable hinge lock 21 is manually moved to the right through slide retainer 27, disengaging from slide retainer 28; thus hinged joint 9 can bend. Rotatable hinge lock 22 is rotated out of hinge lock 29, to position 30, allowing the bending of hinged joint 10. The other hinged joint 11 is similarly unlocked. The reversing of the above mentioned procedure will again lock the hinges presenting a rigid writing aid once again.

FIG. 3 shows the writing aid with hinged joints 9, 10 & 11 partially bent, with hinged joints 10 & 11 bent in one direction, while hinged joint 9 is bent in the opposite direction, thus allowing surface portions 31 & 32 to approach each other, while support walls 12 & 13 do the same.

FIG. 4 shows the writing aid in its total collapsed position with the hinged joints 9, 10 & 11 bent through their entire range of motion. With hinged joints 10 & 11 touching, and support walls 12 & 13 parallel, both halves of supports 15 & 16 touching, and both sides of retainers 17 & 40 touching—the writing aid, so collapsed, has the same dimensions as video cassette 14. This allows for storage of the writing aid in the same amount of space is taken by a video cassette.

FIG. 5 shows the second embodiment of the writing aid 34 consisting of handrest surface 35. Attached, at approximately 90 degrees to the handrest surface, is support and tape locater 36. This member has tape support 37 attached to it, at approximately 90 degrees, in a direction opposite to handrest surface 35. Along the outermost edge of tape support 37 is tape retainer 38. Video cassette 14 is placed between retainer 38 and support and tape locator 36 and is supported by support 37. The non-writing hand holds both the tape and writing aid, while the writing hand rests on surface 35, allowing easier writing upon edge 18 of the video cassette 14. A cutout 39 allowing finger access in handrest surface 35 and support locator 36, facilitates easy removal of the cassette from the writing aid. A second handrest surface 42 can be attached allowing easier writing upon the short edge 43, of the video cassette 14.

FIG. 6 shows another means of locking hinged joints 9, 10 & 11. A flap 46 is attached by a continuous hinge 44 along the entire edge 48 of the handrest surface. The hinge 44 is shown crossing hinged joints 9, 10 & 11 perpendicularly. When tab 46 is parallel to the handrest surface 8, hinged joints 9, 10 & 11 will bend allowing collapse of the writing aid. However, when flap 46 is locked in its position perpendicular to handrest surface 8, the hinged joints 9, 10 & 11 will not bend. A similar hinged flap 47, at the edge 45 of the handrest surface, supports that edge rigidly also.

While the invention has been described in connection with what is presently considered to be the most practical and preferred embodiments, it is to be understood that the invention is not to be limited to the disclosed embodiments, but on the contrary, is intended to cover various modifications and equivalent arrangemnts included within the spirit and scope of the appended claims; which scope is to be accorded the broadest interpretation, so as to encompass all such modifications and equivalent structures.

What is claimed is:

1. A writing aid for use with cassettes having a standard width W, length L, depth D and a writing surface, comprising:
   a handrest surface having a first end, a second end and a long edge extending between said first and second ends approximately equal to the length L of a cassette; and
   means for releasably supporting said cassette with said writing surface and length L of said cassette generally coplanar with and adjacent to the long edge of said handrest surface to facilitate writing on said writing surface of said cassette, wherein said releasable supporting means includes;
   a first cassette-retaining member depending downwardly from said long edge of said handrest surface generally perpendicular to said handrest surface;
   a second cassette-retaining member depending generally perpendicular to said first cassette-retaining member outwardly with the respect to said handrest surface and spaced vertically from said handrest surface a distance approximately equal to said depth D of said cassette, and
   a third cassette-retaining member depending upwardly from and generally perpendicular to said second cassette-retaining member, spaced outwardly from and generally parallel to said first cassette-retaining member a distance approximately equal to said width W of said cassette, and terminating at a point vertically lower than the handrest surface.

2. The writing aid of claim 1, further comprising:
   means for collapsing said handrest surface from an erected position to a collapsed position such that in the collapsed position the first and second ends of the handrest surface are spaced from one another at a distance approximately equal to the wdith W of the cassette.

3. The writing aid of claim 2, further comprising:
   means for locking said handrest surface in said erected position.

4. The writing aid of claim 1, further comprising:
   finger access means disposed in said handrest surface communicating with said long edge for removing said cassette from said means for releasably supporting said cassette.

5. The writing aid of claim 1, further comprising:
   first and second vertically disposed support walls depending downwardly from and generally perpendicular to said first and second ends respectively of said handrest surface.

6. The writing aid of claim 2, wherein said means for collapsing further comprises:
   first, second and third hinge joints disposed on said handrest surface having parallel hinge axes, said first and second hinge joints disposed spaced inwardly from said first and second ends respectively of said handrest surface and said third hinge joint disposed generally midway between said first and second hinge joints.

7. A writing aid for use with a cassette having a width, a length, a depth and a writing surface, comprising:
   a handrest surface having a first end, a second end and a long edge extending between said first and second ends;
   means for releasably supporting said cassette with said writing surface of said cassette generally coplanar with said handrest surface to facilitate writing on said writing surface of said cassette, wherein said releasable supporting means includes:
   a first cassette-retaining member depending downwardly from said long edge of said handrest surface generally perpendicular to said handrest surface;
   a second cassette-retaining member depending generally perpendicular to said first cassette-retaining member outwardly with the respect to said handrest surface and spaced vertically from said handrest surface a distance approximately equal to said depth of said cassette;
   a third cassette-retaining member depending upwardly from and generally prependicular to said second cassette-retaining member, spaced outwardly from and generally parallel to said first cassette-retaining member a distance approximately equal to said width of said cassette; and
   a fourth cassette-retaining member depending outwardly from and generally perpendicular to said third cassette-retaining member and spaced vertically from said handrest surface a distance generally equal to said width of said cassette.

8. The writing aid of claim 7, further comprising:
first and second vertically disposed support walls depending downwardly from and generally perpendicular to said first and second ends respectively of said handrest surface.

9. The writing aid of claim 7, further comprising finger access means disposed in the handrest surface of sufficient size for grasping said cassette to facilitate removal of said cassette.

10. The writing aid of claim 7, further comprising hinge means disposed in the handrest surface for collapsing the handrest surface from an erected position to a collapsed position.

11. The writing aid of claim 10, further comprising a slidable hinge locking means for releasably locking the handrest surface in the erected position.

12. The writing aid of claim 10, further comprising rotational hinge locking means for releasably locking the handrest surface in the erected position.

13. The writing aid of claim 10, further comprising both a slidable and rotational hinge locking means for releasably locking the handrest surface in the erected position.

14. A writing aid for use with a cassette having a width, a length, a depth and a writing surface, comprising:
a handrest surface having a first end, a second end and a long edge extending between said first and second ends;
means for releasably supporting said cassette with said writing surface of said cassette generally coplanar with said handrest surface to facilitate writing on said writing surface of said cassette;
means for collapsing said handrest surface from an erected position to a collapsed position, wherein said means for collapsing includes:
first, second and third hinge joints disposed on said handrest surface having parallel hinge axes, said first and second hinge joints disposed inwardly from said first and second ends respectively of said handrest surface and said third hinge joint disposed generally midway between said first and second hinge joints; and
a flap pivotally connected to said handrest surface having a fourth hinge joint intersecting said first, second and third hinge joints, said flap pivotable between a first position generally parallel to said handrest surface allowing pivotal movement about said first, second and third hinge joints for collapsing said handrest surface into said collapsed position, and a second position generally perpendicular to said handrest surface for releasably locking said handrest surface in said erected position.

15. The writing aid of claim 1, wherein said releasable supporting means comprises:
a first cassette-retaining member depending downwardly from said long edge of said handrest surface generally perpendicular to said handrest surface;
a second cassette-retaining member depending generally perpendicular to said first cassette-retaining member outwardly with respect to said handrest surface and spaced vertically from said handrest surface a distance approximately equal to said depth of said cassette; and
a third cassette-retaining member depending upwardly from and generally perpendicular to said second cassette-retaining member, spaced outwardly from and generally parallel to said first cassette-retaining member at a distance approximately equal to said width of said cassette.

16. The writing aid of claim 14, further comprising:
finger access means disposed in said handrest surface communicating with said long edge for removing said cassette from said means for releasably supporting said cassette.

17. The writing aid of claim 14, further comprising:
first and second vertically disposed support walls depending downwardly from and generally perpendicular to said first and second ends respectively of said handrest surface.

18. A writing aid for use with a cassette having a width, a length, a depth and a writing surface, comprising:
a handrest surface having a first end, a second end and a long edge extending between said first and second ends approximately equal to the length of said cassette;
a first support attached to the first end of the handrest surface having a width approximately equal to the length of the cassette and a height approximately equal to the depth of the cassette;
a second support attached to the second end of the handrest surface having a width approximately equal to the length of the cassette and a height approximately equal to the depth of the cassette;
a first cassette-retaining member depending downwardly from said handrest surface generally perpendicular to said handrest surface and said first and second supports;
a second cassette-retaining member depending generally perpendicular to said first cassette-retaining member and outwardly with respect to said handrest surface, spaced vertically from said handrest surface a distance generally equal to said depth of said cassette;
a third cassette-retaining member depending generally perpendicular to said second cassette-retaining member and upwardly from and generally parallel to said first cassette-retaining member, spaced outwardly from said first cassette-retaining member a distance generally equal to said width of said cassette;
first, second and third hinge joints disposed on said handrest surface having parallel hinge axes, said first and second hinge joints disposed spaced inwardly from said first and second ends of said handrest surface and said third hinge joint disposed generally midway between said first and second hinge joints, said first, second and third hinge joints for collapsing movement of said handrest surface from an erected position wherein said handrest surface is generally perpendicular to said first and second supports, and to a collapsed position wherein said handrest surface pivots about said first, second and third hinge joints downward to draw said first and second supports toward one another such that a portion of the handrest surface is disposed generally parallel to said first and second supports and said long edge of said handrest surface is reduced in length to approximately the width of said cassette; and
a flap pivotally connected to said handrest surface having a fourth hinge joint intersecting said first, second and third hinge joints, said flap pivotable between a first position generally parallel to said handrest surface allowing pivotal movement of said first, second and third hinge joints for collapsing movement of said handrest surface into said collapsed position and a second position generally perpendicular to said handrest surface for locking said handrest surface in said erected position.

* * * * *